(12) United States Patent
Shirono (10) Patent No.: US 8,299,418 B2
(45) Date of Patent: Oct. 30, 2012

(54) IMAGING DEVICE UNIT AND PHOTOGRAPHING APPARATUS COMPRISING A PIEZOELECTRIC ELEMENT MOUNTED ON A PLATE

(75) Inventor: Masahiro Shirono, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 375 days.

(21) Appl. No.: 12/611,229

(22) Filed: Nov. 3, 2009

(65) Prior Publication Data

US 2010/0108871 A1    May 6, 2010

(30) Foreign Application Priority Data

Nov. 6, 2008  (JP) .................. 2008-285350

(51) Int. Cl.
*H01J 3/14* (2006.01)
*H04N 5/225* (2006.01)
*G03B 17/00* (2006.01)

(52) U.S. Cl. .............. 250/234; 348/340; 396/439

(58) Field of Classification Search .......... 250/216, 250/234; 348/335, 340; 396/439
See application file for complete search history.

(56) References Cited

U.S. PATENT DOCUMENTS

| | | | |
|---|---|---|---|
| 7,006,138 B2 | 2/2006 | Kawai | |
| 7,324,148 B2 | 1/2008 | Takizawa et al. | |
| 7,324,149 B2 | 1/2008 | Takizawa et al. | |
| 2007/0103554 A1 | 5/2007 | Kaihara et al. | |
| 2008/0226285 A1* | 9/2008 | Matsumoto | 396/439 |
| 2009/0257123 A1 | 10/2009 | Okazaki et al. | |

FOREIGN PATENT DOCUMENTS

| | | |
|---|---|---|
| JP | 2002-204379 A | 7/2002 |
| JP | 2003-319222 A | 11/2003 |
| JP | 2003-338965 A | 11/2003 |
| JP | 2008-028665 A | 2/2008 |
| JP | 2008-199299 A | 8/2008 |
| JP | 2008-203554 A | 9/2008 |
| JP | 2009-130615 A | 6/2009 |
| KR | 1020070049040 A | 5/2007 |

OTHER PUBLICATIONS

Office Action established for JP 2008-285350 (Aug. 7, 2012).

* cited by examiner

*Primary Examiner* — Thanh Luu
(74) *Attorney, Agent, or Firm* — Drinker Biddle & Reath LLP (57) ABSTRACT

Provided are an imaging device unit and a photographing apparatus. The imaging device unit includes an imaging device having an imaging plane on which an optical image of a subject is formed, wherein the imaging unit is configured to convert the optical image into an electrical signal; an optical unit disposed nearer to the subject than the imaging device; a plate that is mounted on a boundary portion of the optical unit, wherein at least an outer portion of the plate extends over an outer edge of the optical unit; a piezoelectric element that is mounted on the plate and configured to vibrate the plate and the optical unit; and a supporting frame that supports the at least outer portion of the plate extending over the outer edge of the optical unit.

8 Claims, 8 Drawing Sheets

IMAGING DEVICE UNIT AND PHOTOGRAPHING APPARATUS COMPRISING A PIEZOELECTRIC ELEMENT MOUNTED ON A PLATE

CROSS-REFERENCE TO RELATED PATENT APPLICATION

This application claims the benefit of Japanese Patent Application No. 2008-285350, filed on Nov. 6, 2008, in the Japanese Intellectual Property Office, the entire contents of which is incorporated by reference.

BACKGROUND OF THE INVENTION

1. Field of the Invention

The present invention relates to an imaging device unit and a photographing apparatus.

2. Description of the Related Art

With the recent increase in the number of pixels of an imaging device, the pixel pitch has become finer. Accordingly, dust shadows attached on a surface of an optical device near an imaging plane of the imaging device are reflected on a captured image, thereby decreasing image quality.

SUMMARY OF THE INVENTION

The present invention provides an imaging device unit which is capable of removing foreign substances such as dust from optical units.

An imaging device unit is provided. The imaging device unit includes an imaging device having an imaging plane on which an optical image of a subject is formed, and configured to convert the optical image into an electrical signal; an optical unit disposed nearer to the subject than the imaging device; a plate that is mounted on a boundary portion of the optical unit, wherein at least an outer portion of the plate extends over an outer edge of the optical unit; a piezoelectric element that is mounted on the plate and configured to vibrate the plate and the optical unit; and a supporting frame that supports the at least outer portion of the plate extending over the outer edge of the optical unit.

The plate may include a holding portion into which the optical unit is inserted to be supported by the holding portion.

An photographing apparatus is provided. The photographing apparatus may include an imaging optical system configured to form an optical image of a subject; an imaging device having an imaging plane on which the optical image of the subject is formed, and configured to convert the optical image into an electrical signal; an optical unit disposed nearer to the subject than the imaging device; a plate that is in contact with a boundary portion of the optical unit, wherein at least an outer portion of the plate extends over an outer edge of the optical unit; a piezoelectric element that is mounted on the plate and vibrates the plate and the optical unit; and a supporting frame in contact with the at least outer portion of the plate extending over the outer edge of the optical unit.

The plate may include a holding portion into which the optical unit is inserted to be supported by the holding portion.

The plate may include fingernail portions and supporting portions and wherein the optical unit is inserted between the fingernail portions and the supporting portions.

A photographing apparatus is provided. The photographing apparatus may include an imaging device having an imaging plane on which the optical image of a subject is formed, and configured to convert the optical image into an electrical signal; an optical unit disposed nearer to the subject than the imaging device; a plate comprising fingernail portions and supporting portions and wherein the optical unit is inserted between the fingernail portions and the supporting portions; a piezoelectric element that is mounted on the plate and vibrates the plate and the optical unit; and a supporting frame in contact with the plate.

The photographing apparatus may include a second supporting frame in contact with the piezoelectric element, and configured so that the plate and the piezoelectric element are supported by being between the supporting frame and the second supporting frame.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Therefore, there is a need in the art for an imaging device unit including an imaging device having an imaging plane on which an optical image of a subject is formed, and configured to convert the optical image into an electrical signal; an optical unit disposed nearer to the subject than the imaging device; a plate that is mounted on a boundary portion of the optical unit, wherein at least an outer portion of the plate extends over an outer edge of the optical unit; a piezoelectric element that is mounted on the plate and configured to vibrate the plate and the optical unit; and a supporting frame that supports the at least outer portion of the plate extending over the outer edge of the optical unit.

The present invention will now be described more fully with reference to the accompanying drawings, in which exemplary embodiments of the invention are shown. Like reference numerals in the drawings denote like elements, and thus their description will be omitted.

Figure 1:
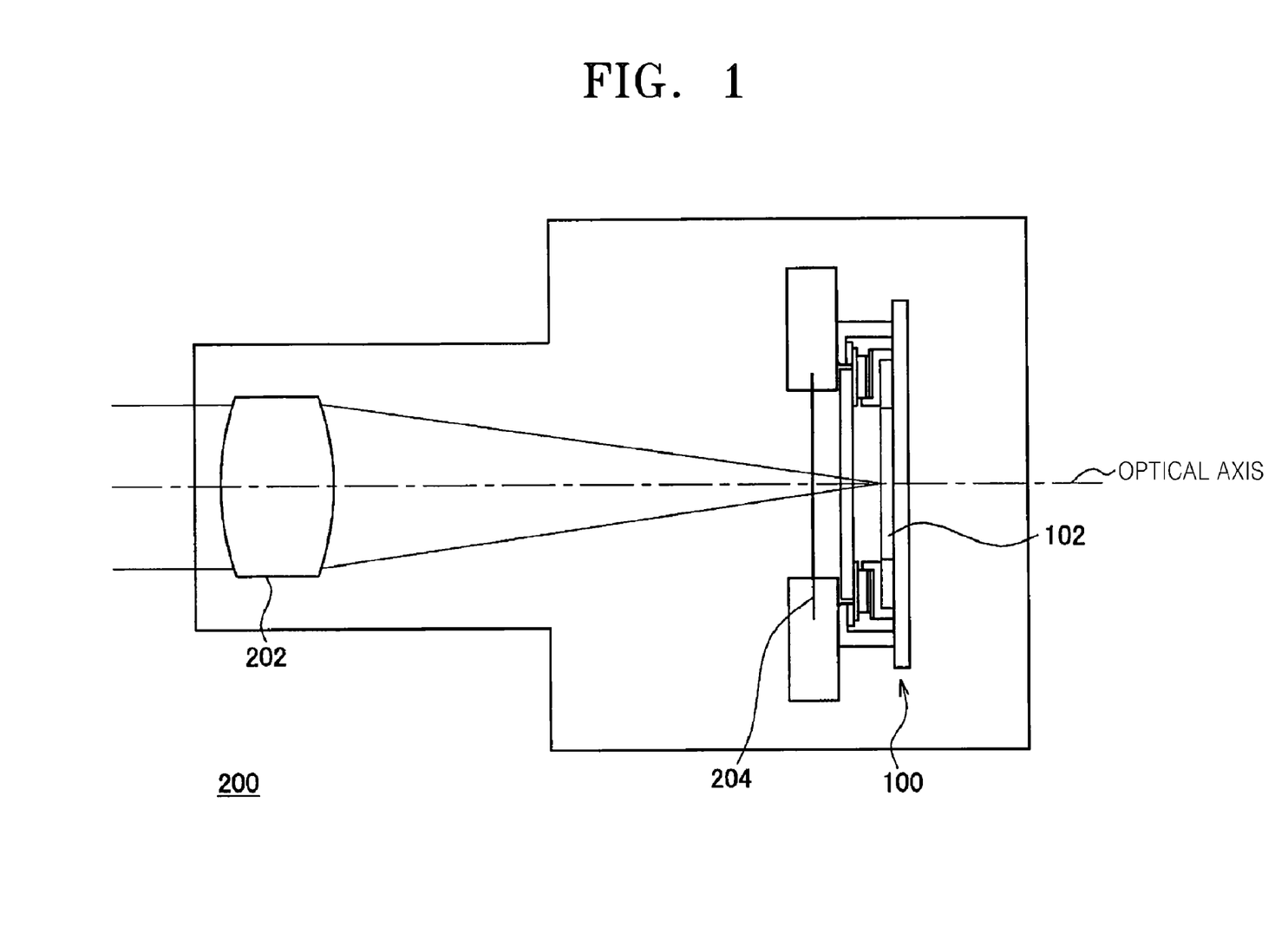
FIG. 1 is a cross-sectional view illustrating an example of main elements of a photographing apparatus.

FIG. 1 is a cross-sectional view illustrating an example of main elements of a photographing apparatus 200.

The photographing apparatus 200 includes an imaging lens 202 disposed inside thereof, and a focal point adjusting unit (not shown) which can adjust a focusing position by moving the imaging lens 202 or some lenses of the imaging lens 202 along an optical axis direction. In the example illustrated, optical systems used for imaging are referred to as imaging optical systems, among the elements of the photographing apparatus 200.

Based on the imaging lens 202, an imaging device unit 100 is arranged opposite to a subject. The imaging device unit 100 includes an imaging device 102 which is a photoelectrical converter and is formed of a sensor such as a charge-coupled device (CCD), a complementary metal-oxide-semiconductor (CMOS), or the like. An image of a subject transmitted through the imaging lens 202 is formed on an imaging plane of the imaging device 102.

Also, a shutter 204 for adjusting an exposure amount regarding the imaging device 102 is disposed between the imaging lens 202 and the imaging device unit 100. The imaging device unit 100 is fixed to a main body of the photographing apparatus 200 through a supporting portion (not shown).

Figure 2:
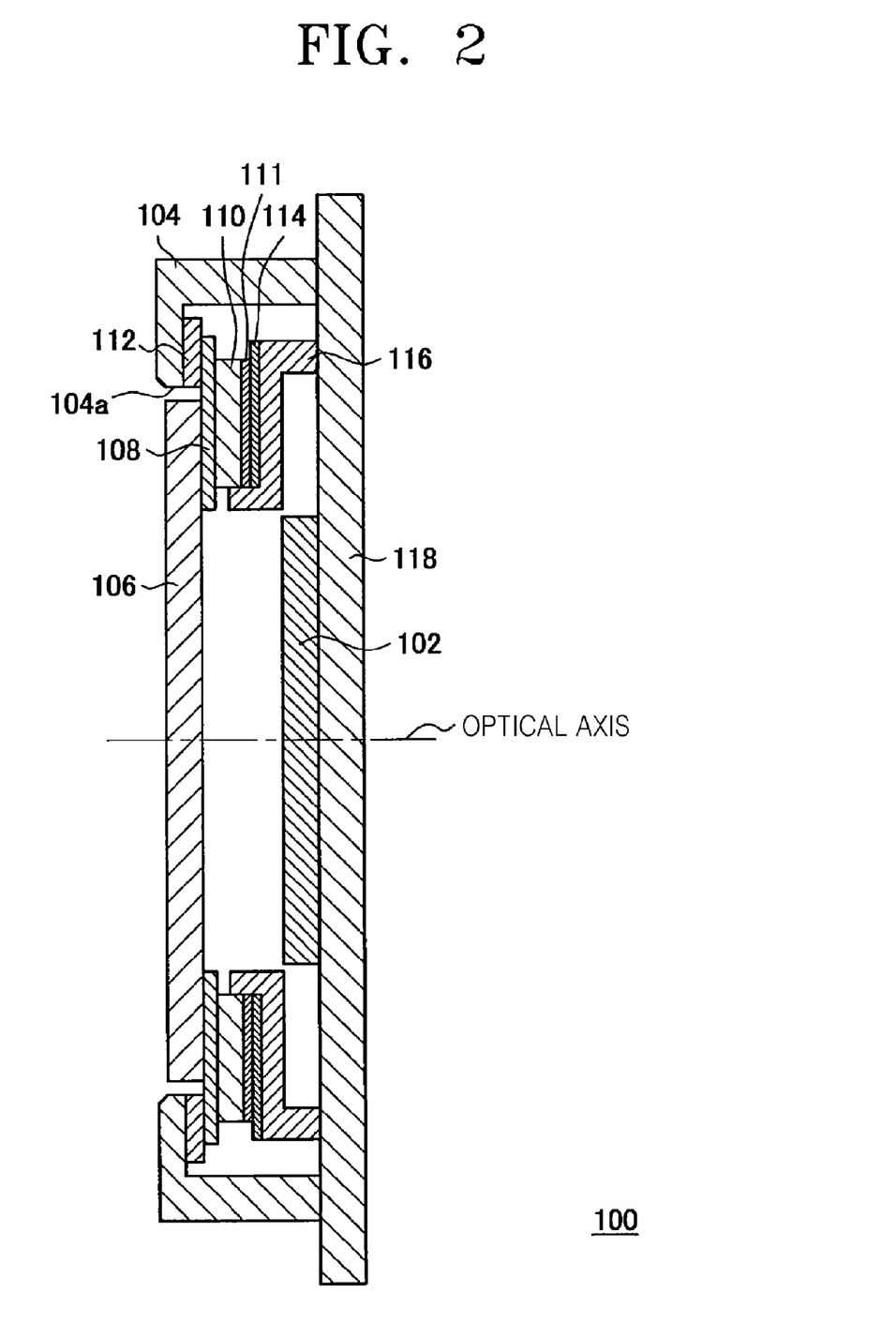
FIG. 2 is an enlarged cross-sectional view of an example of an imaging device unit of the photographing apparatus of FIG. 1.

FIG. 2 is an example of an enlarged cross-sectional view of the imaging device unit 100 of the photographing apparatus of FIG. 1.

As illustrated in FIG. 2, the imaging device unit 100 includes the imaging device 102, a supporting frame 104, a low-pass filter (LPF) 106, a metal plate 108, piezoelectric elements 110, a flexible printed circuit board 111, cushioning members 112 and 114, an inner supporting frame 116, and a substrate 118.

According to the current example, the LPF 106 is an optical unit that is vibrated by the piezoelectric elements 110. Other examples of the LPF 106 are a lens and a glass substrate. Referring to FIG. 2, the imaging device 102 is mounted on the substrate 118, and the supporting frame 104 and the inner supporting frame 116 are fixed to the substrate 118. The imaging plane of the imaging device 102 faces an opening portion 104a of the supporting frame 104.

The two piezoelectric elements 110 are disposed above and below the optical axis, respectively. The flexible printed circuit board 111 that transmits a signal to the piezoelectric elements 110 is mounted on a surface of the piezoelectric elements 110 facing the imaging device 102. The piezoelectric elements 110 and the flexible printed circuit board 111 are mounted on the inner supporting frame 116 via the cushioning member 114.

Also, the piezoelectric elements 110 are fixed to the LPF 106 via the metal plate 108, and the metal plate 108 is mounted on the supporting frame 104 via the cushioning member 112.

Figure 3:
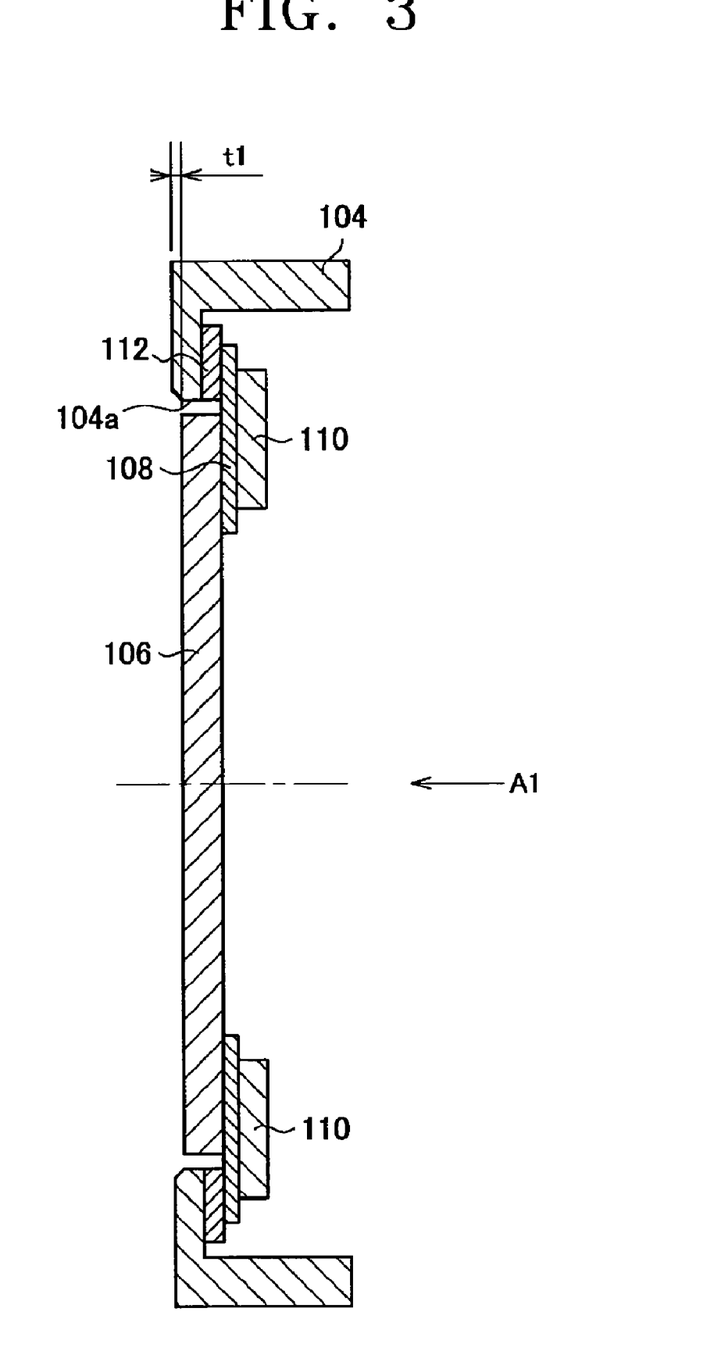
FIG. 3 is a cross-sectional view illustrating an example of the arrangement of a supporting frame, a low-pass filter (LPF), a metal plate, and a piezoelectric element of the imaging device unit of FIG. 2.

FIG. 3 is a cross-sectional view illustrating an example of the arrangement of the supporting frame 104, the LPF 106, the metal plate 108, and the piezoelectric element 110 of the imaging device unit 100 of FIG. 2.

As illustrated in FIG. 3, the metal plate 108 is mounted on a surface of the LPF 106 facing the imaging device 102. The metal plate 108 is adhered to the LPF 106 by using an adhesive such as an epoxy adhesive, ultraviolet-ray curing adhesive, etc.

Figure 4:
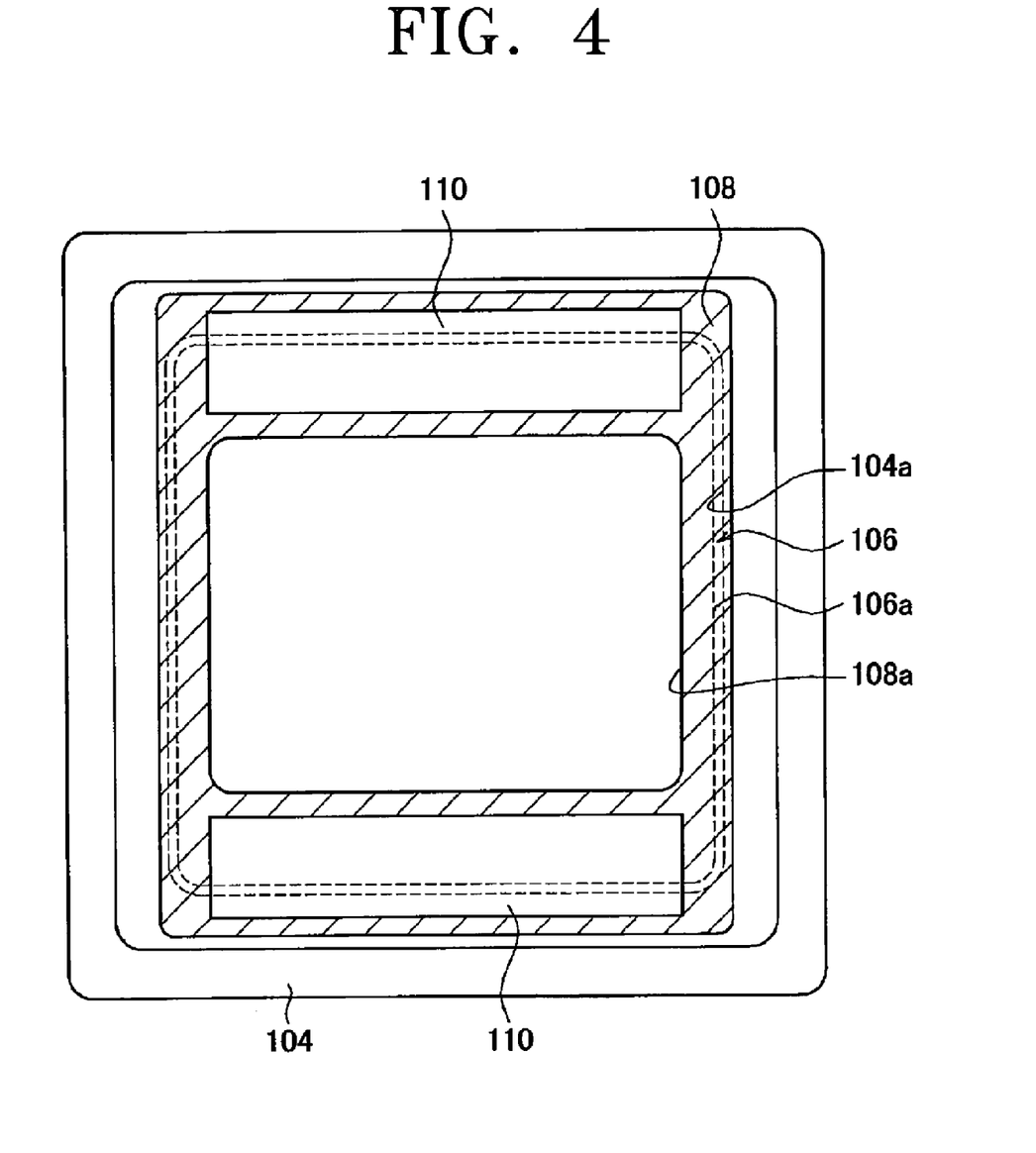
FIG. 4 is a plan view illustrating an example of the imaging device unit as seen in an arrow direction A1 of FIG. 3.

FIG. 4 is an example of a plan view illustrating the imaging device unit 100 seen in an arrow direction A1 of FIG. 3.

As illustrated in the example in FIG. 4, the LPF 106 has a rectangular shape having four rounded corners. The LPF 106 is inserted into a rectangular opening portion 104a formed in the supporting frame 104.

The metal plate 108 has a rectangular shape having an area extending over an outer edge 106a of the LPF 106. Also, the metal plate 108 includes an opening portion 108a that is smaller than the outer edge 106a of the LPF 106. Accordingly, the LPF 106 is adhered to the metal plate 108 by using an area between the opening portion 108a and the outer edge 106a of the LPF 106 as an adhesion surface.

As illustrated in FIG. 3, the piezoelectric elements 110 are adhered to the surface of the metal plate 108 facing the imaging device 102. As illustrated in FIG. 4, the two piezoelectric elements 110 are mounted on upper and lower portions of the metal plate 108, respectively.

Also, a periodic voltage is applied from the flexible printed circuit board 111 to the piezoelectric elements 110. In an embodiment, the piezoelectric elements 110 are polarized in the same direction as a direction of a planar thickness of the piezoelectric elements 110, that is, in the optical axis direction of the imaging lens 202. The periodic voltage is applied from an oscillator generating a periodic signal to a surface of a piezoelectric body of the piezoelectric elements 110. The periodic signal may be a spherical wave or a sine wave.

Also, periodic voltages of the same phase or opposite phases may be applied to the piezoelectric elements 110. When a voltage is applied to the piezoelectric elements 110, the piezoelectric elements 110 are in an extensional-compressional vibration mode in a length direction thereof.

In an embodiment, the metal plate 108 adhered to the piezoelectric elements 110 is hardly extended in an extension direction of the piezoelectric elements 110, and thus bending vibration is generated in a complex body of the piezoelectric elements 110, and the metal plate 108 and the LPF 106 due to a difference between the extension rate of the piezoelectric elements 110 and the metal plate 108. Accordingly, a material point of an antinode of the bending vibration of the piezoelectric elements 110 vibrates in the optical axis direction, thereby having greatest amplitude of vibration. Also, amplitude of vibration of the material point is 0 at nodes of the bending vibration, and thus the material point at nodes of the vibration only performs rotational movement. The material point conducts vibration in circular arcs around nearby nodes between the antinode and the node of the bending vibration.

The metal plate 108 adhered to the piezoelectric elements 110 is in bending motion according to the extensional-compressional motion of the piezoelectric elements 110, and the LPF 106 adhered to the metal plate 108 is also in bending motion along with the metal plate 108. Accordingly, as the LPF 106 is in bending motion, dust or particles attached to a surface of the LPF 106 facing the surface of a subject can be removed.

The metal plate 108 is mounted on the supporting frame 104, having the cushioning member 112 interposed therebetween. Also, the piezoelectric elements 110 are mounted on the inner supporting frame 116 via the cushioning member 114. Accordingly, the bending motion of the piezoelectric elements 110 is prevented from being spread to the supporting frame 104 and the inner supporting frame 116.

Also, the cushioning member 112 is arranged all around the metal plate 108. Accordingly, as illustrated in FIG. 2, when the supporting frame 104, the cushioning member 112, the metal plate 108, and the LPF 106 are mounted to the substrate 118, a space between the LPF 106 and the imaging device 102 is tightly closed. Thus, dust can be prevented from attaching to the surface of the LPF 106 facing the imaging device 102, thereby completely preventing dust from attaching to the imaging plane of the imaging device 102.

In an embodiment, an outer edge of the metal plate 108 is larger than the outer edge 106a of the LPF 106, and thus, a predetermined area is provided around the LPF 106 on the side of the metal plate 108 opposite to the side thereof at the imaging device 102. Accordingly, an area where the metal plate 108 and a surface of the supporting frame 104 facing the imaging device 102 are attached to each other via the cushioning member 112 can be ensured, and by adhering the metal plate 108 to the supporting frame 104 via the cushioning member 112, the LPF 106 and the piezoelectric elements 110 can be supported.

If the LPF 106 is directly adhered to the supporting frame 104, both the supporting frame 104 and the LPF 106 are arranged along the optical axis, and thus a large space along the optical axis is necessary.

Figure 5:
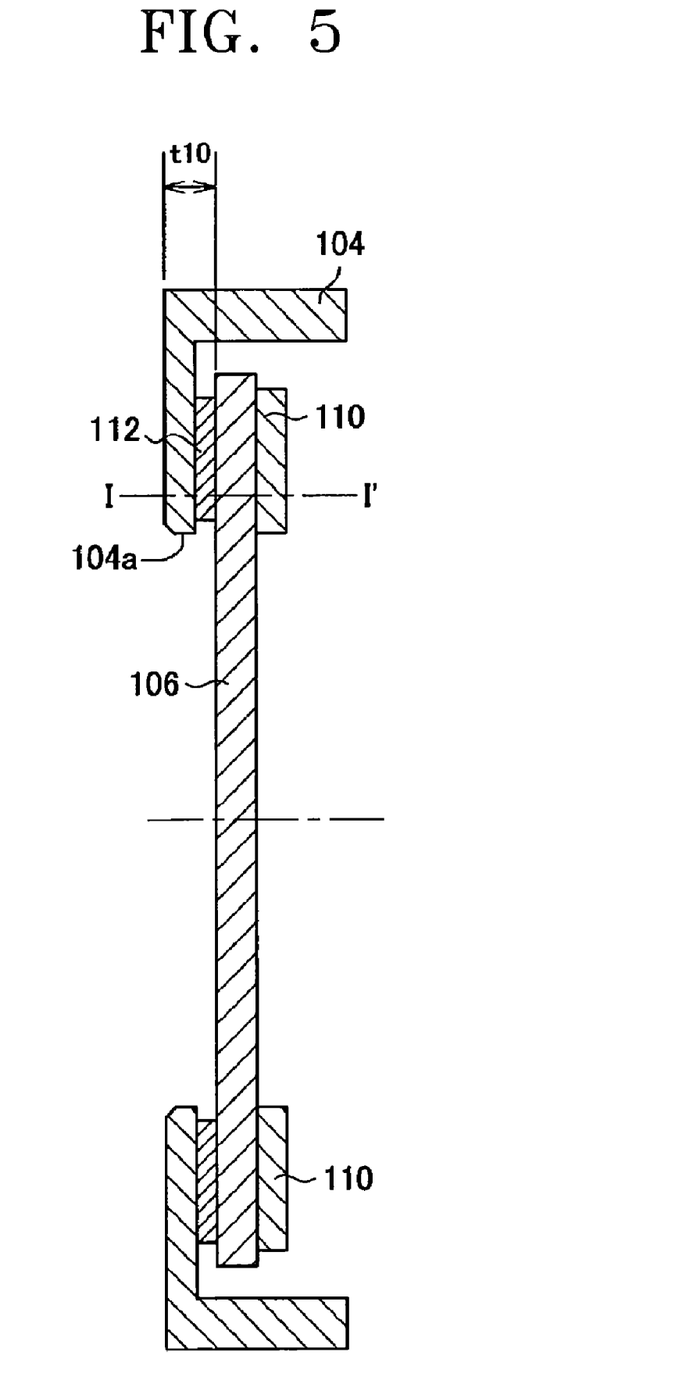
FIG. 5 is a cross-sectional view illustrating a comparative example of a supporting frame to which a low-pass filter is adhered thereto, having a cushioning member interposed therebetween.

FIG. 5 is a cross-sectional view illustrating a comparative example of the supporting frame 104 to which the LPF 106 is adhered, having a cushioning member 112 interposed therebetween. Along an alternated long and short dash line I-I', the supporting frame 104, the cushioning member 112, the LPF 106, and piezoelectric elements 110 are arranged along an optical axis to overlap one another, and thus a distance t10 between a surface of the supporting frame 104 facing a subject and a surface of the LPF 106 facing the subject is increased.

However, in the example described with reference to FIG. 3, the supporting frame 104 is disposed outside the outline of the LPF 106, and the supporting frame 104 and the LPF 106 are not overlapped along the optical axis, and thus a distance t1 between a surface of the supporting frame 104 facing a subject and a surface of the LPF 106 facing the subject can be sufficiently minimized. Thus, the imaging device unit 100 can be formed with a smaller thickness, and thus, the imaging device unit 100 has a compact size.

In addition, according to the comparative example of FIG. 5, in order to fix the piezoelectric elements 110 to the LPF 106, the outer edge 106a of the LPF 106 needs to be larger than the opening portion 104a of the supporting frame 104, and an area where the LPF 106 and the supporting frame 104 overlap in the optical axis direction is necessary. Accordingly, the size of the outer edge 106a of the LPF 106 is increased, and thus an outer edge of the supporting frame 104 is also increased, thereby increasing the size of the imaging device unit 100.

However, according to the example described with reference to FIG. 3, the metal plate 108 is fixed to the supporting frame 104, and thus there is no need for an area of overlap between the LPF 106 and the supporting frame 104. Accordingly, the LPF 106 can be formed to have a compact size, and the imaging device unit 100 can also be formed to have a compact size in a direction across the optical axis. Also, the size of the LPF 106 can be reduced, thereby significantly reducing manufacturing costs.

In an example described above, the metal plate 108 is adhered to the LPF 106 such that a portion of the metal plate 108 surrounds the LPF 106, and the metal plate 108 is supported by the supporting frame 104. Thus, the imaging device unit 100 can be formed with a small thickness in an optical axis direction, and the size of the imaging device unit 100 can also be reduced in a direction perpendicular to the optical axis direction. Thus, the imaging device unit 100 may have a compact size and a light weight, and consequently, the photographing apparatus 200 may have a compact size and a light weight.

Figure 6:
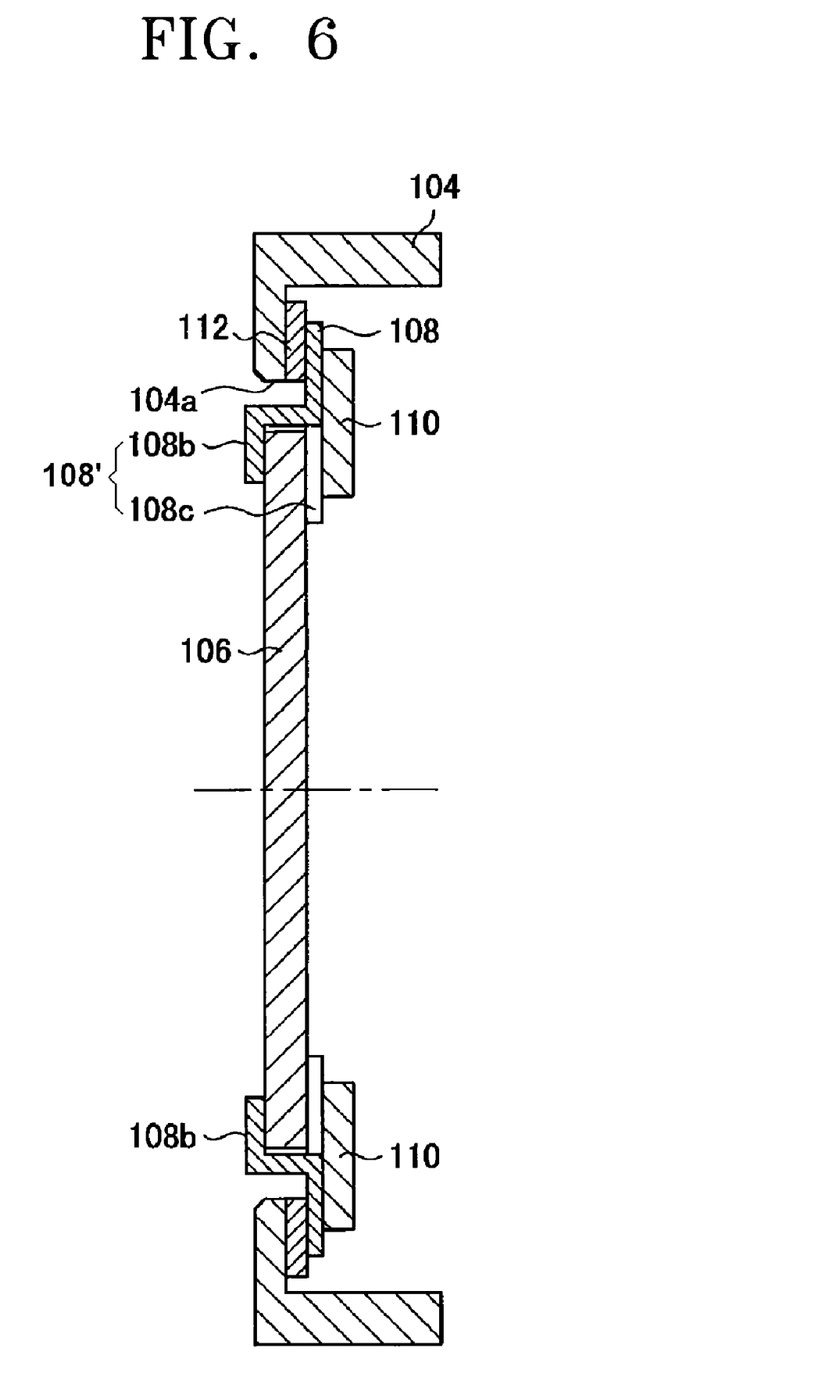
FIG. 6 is a cross-sectional view illustrating an example of the arrangement of a supporting frame, a low-pass filter, a metal plate, and a piezoelectric element of an imaging device unit.

FIG. 6 is a cross-sectional view illustrating an example of the arrangement of a supporting frame 104, a LPF 106, a metal plate 108, and a piezoelectric element 110 of the imaging device unit.

The basic configuration of the imaging device is the same as that in the example described with reference to FIG. 3, except that the metal plate 108 and the LPF 106 are not adhered to each other.

Figure 7:
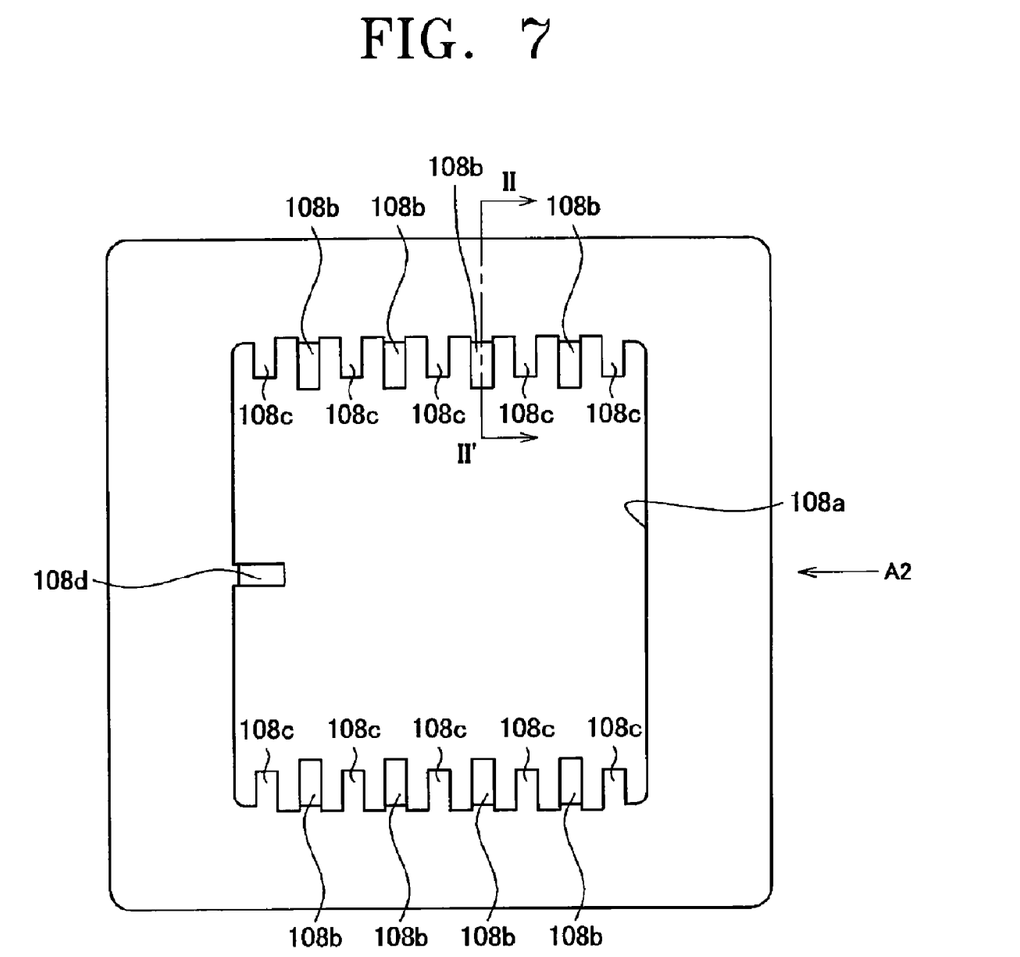
FIG. 7 is an example of a plan view of the metal plate of FIG. 6.

As illustrated in FIGS. 6 and 7, fingernail portions 108b are formed at two sides of the metal plate 108, and the two sides of the metal plate 108 face each other across an opening portion 108a of the metal plate 108. In an embodiment, the fingernail portions 108b are formed as a single body with the metal plate 108 by using a pressing process.

FIG. 7 is a plan view of an example of the metal plate 108 of FIG. 6. The metal plate 108 is viewed from a point of view of a subject. Referring to FIG. 7, the fingernail portions 108b are formed at two opposite sides of the metal plate 108 across the opening portion 108a of the metal plate 108, respectively. Also, a plurality of supporting portions 108c are formed at the two opposite sides of the metal plate 108 near the fingernail portions 108b.

Figure 8:
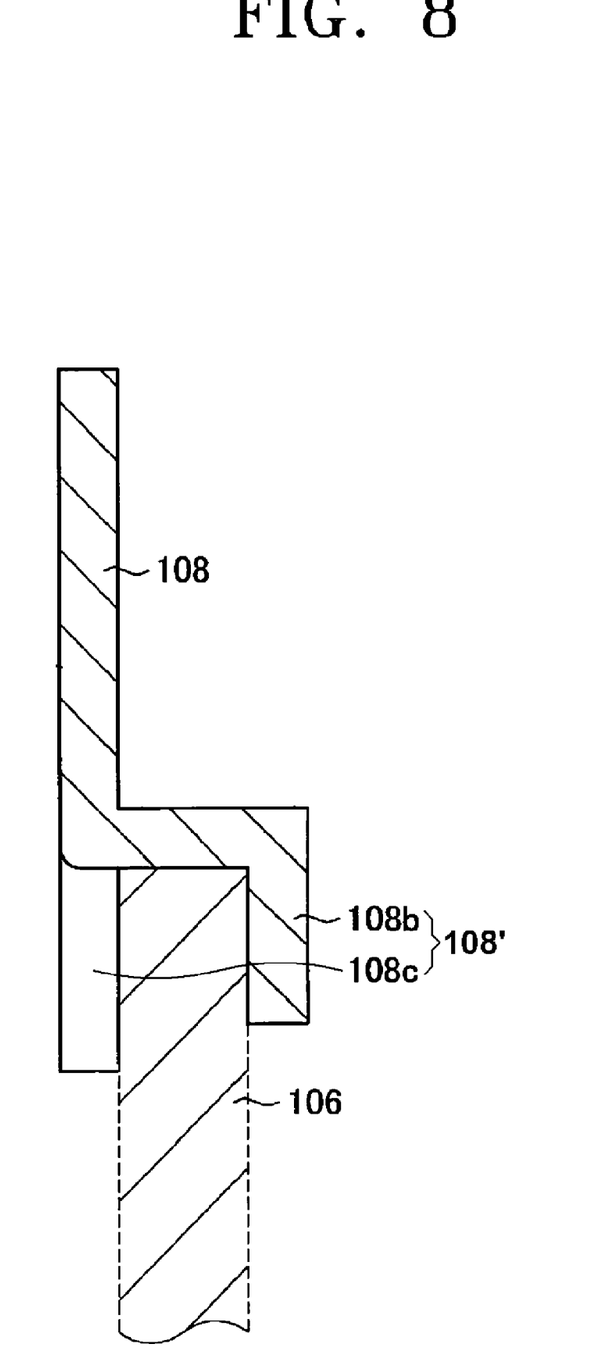
FIG. 8 is an example of a cross-sectional view taken along an alternated long and short dash line II-II' of FIG. 7.

FIG. 8 is an example of a cross-sectional view taken along an alternated long and short dash line II-II' of FIG. 7.

Referring to FIG. 8, the fingernail portions 108b are protruded toward the subject from a side of the metal plate 108 facing the subject. The supporting portions 108c are each disposed on the same plane as the metal plate 108 as a boundary portion of the metal plate 108. Also, a distance between the fingernail portion 108b and the supporting portion 108c corresponds to the thickness of the LPF 106, and the LPF 106 is interposed between the fingernail portions 108b and the supporting portions 108c. That is, as illustrated in FIG. 6, the fingernail portions 108b and the supporting portions 108c constitute a holding portion 108', and the LPF 106, which is an optical unit, is inserted into the holding portion 108', that is, the LPF 106 is interposed between the fingernail portions 108b and the supporting portions 108c.

As described above, the holding portion 108' comprising the fingernail portions 108b and the supporting portions 108c is formed on two opposite sides of the metal plate 108 across the opening portion 108a of the metal plate 108, and thus the LPF 106 can be fixed by inserting the same between the fingernail portions 108b and the supporting portions 108c of the holding portion 108'.

Accordingly, there is no need to adhere the LPF 106 and the metal plate 108 to each other, thereby simplifying the manufacturing process. Referring to FIG. 7, the LPF 106 is inserted into a space between the fingernail portions 108b and the supporting portions 108c in an arrow direction A2.

One fingernail portion 108d is formed on one of the other two opposite sides of the metal plate 108 where the fingernail portions 108b and the supporting portions 108c are not formed. The fingernail portion 108d has the same structure as the fingernail portions 108b, and functions as a stopper that restricts the movement of the LPF 106 which is inserted between the fingernail portions 108b and the supporting portions 108c in the arrow direction A2. The LPF 106 that is inserted between the fingernail portions 108b and the supporting portions 108c in the arrow direction A2 is restricted from moving by the fingernail portion 108d to be thereby fixed at a predetermined position.

When the metal plate 108 is vibrated according to the vibration of the piezoelectric element 110, since the LPF 106 is interposed between the fingernail portions 108b and the supporting portions 108c, the LPF 106 vibrates with the metal plate 108. Accordingly, the LPF 106 can be vibrated by the vibration of the piezoelectric elements 110 even though the metal plate 108 and the LPF 106 are not adhered to each other.

As described above, as the fingernail portions 180b and the supporting portions 108c are mounted on the metal plate 108 and the LPF 106 is inserted between the fingernail portions 108b and the supporting portions 108c, the LPF 106 can be vibrated without adhering the metal plate 108 to the LPF 106. Accordingly, the manufacturing process can be simplified, and manufacturing costs may be reduced.

In addition, if the metal plate 108 and the LPF 106 are adhered to each other, glass on the surface of the LPF 106 may be exfoliated due to repeated vibration. However, according to the example described above, the metal plate 108 and the LPF 106 are not adhered to each other, and thus such exfoliation may be prevented. In addition, there is no need to adhere anything to the LPF 106, and thus the surface of the LPF 106 may be treated without limitations.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging device unit comprising: an imaging device having an imaging plane on which an optical image of a subject is formed, and configured to convert the optical image into an electrical signal; an optical unit disposed nearer to the subject than the imaging device; a plate that is directly mounted on a boundary portion of the optical unit, wherein at least an outer portion of the plate extends over an outer edge of the optical unit, and the plate comprises a holding portion into which the optical unit is inserted to be supported by the holding portion; a piezoelectric element that is mounted on the plate and configured to vibrate the plate and the optical unit; and a supporting frame that supports the at least one outer portion of the plate extending over the outer edge of the optical unit.

2. The imaging device unit of claim 1, wherein the optical unit is a low pass filter.

3. A photographing apparatus comprising: an imaging optical system configured to form an optical image of a subject; an imaging device having an imaging plane on which the optical image of the subject is formed, and configured to convert the optical image into an electrical signal; an optical unit disposed nearer to the subject than the imaging device; a plate that is in contact with a boundary portion of the optical unit, wherein at least an outer portion of the plate extends over an outer edge of the optical unit, and the plate comprises a holding portion into which the optical unit is inserted to be supported by the holding portion; a piezoelectric element that is mounted on the plate and vibrates the plate and the optical unit; and a supporting frame in contact with the at least one outer portion of the plate extending over the outer edge of the optical unit.

4. The photographing apparatus of claim 3, wherein the plate comprises fingernail portions and supporting portions and wherein the optical unit is inserted between the fingernail portions and the supporting portions.

5. The photographing apparatus of claim 3, wherein the optical unit is a low pass filter.

6. A photographing apparatus comprising:
   an imaging device having an imaging plane on which the optical image of a subject is formed, and configured to convert the optical image into an electrical signal;
   an optical unit disposed nearer to the subject than the imaging device;
   a plate comprising fingernail portions and supporting portions, and wherein the optical unit is inserted between the fingernail portions and the supporting portions;
   a piezoelectric element that is mounted on the plate and vibrates the plate and the optical unit; and
   a supporting frame in contact with the plate.

7. The photographing apparatus of claim 6, comprising:
   a second supporting frame in contact with the piezoelectric element, and configured so that the plate and the piezoelectric element are supported by being between the supporting frame and the second supporting frame.

8. The photographing apparatus of claim 6, wherein the optical unit is a low pass filter.

* * * * *